(12) United States Patent
Bijani et al.

(10) Patent No.: US 10,203,938 B2
(45) Date of Patent: Feb. 12, 2019

(54) APPLICATION ENGINEERING PLATFORM

(71) Applicant: Accenture Global Solutions Limited, Dublin (IE)

(72) Inventors: Pramodsing Bijani, Mumbai (IN); Mahesh Bandkar, Mumbai (IN); Anand Parulkar, Mumbai (MH); Ravi Sachdev, Mumbai (IN); Mufaddal Moazam Kantawala, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/691,215

(22) Filed: Aug. 30, 2017

(65) Prior Publication Data
US 2018/0307464 A1    Oct. 25, 2018

(30) Foreign Application Priority Data

Apr. 21, 2017 (IN) ............................... 201710141 65

(51) Int. Cl.
| | | |
|---|---|---|
| *G06F 9/54* | (2006.01) | |
| *G06F 9/44* | (2018.01) | |
| *H04L 29/08* | (2006.01) | |
| *G06F 8/34* | (2018.01) | |
| *G06F 3/0481* | (2013.01) | |
| *G06N 99/00* | (2010.01) | |

(52) U.S. Cl.
CPC .............. *G06F 8/34* (2013.01); *G06F 3/0481* (2013.01); *G06F 9/541* (2013.01); *G06N 99/005* (2013.01)

(58) Field of Classification Search
CPC .......... G11B 2220/2579; G11B 27/105; G11B 20/00086; G11B 20/10; H04N 21/42646; G06F 3/0481; G06F 3/0482; G06F 3/04815; G06F 8/34; G06F 8/36; G06F 9/541; G06F 9/451; G06F 17/30241; G06F 17/3087; G06F 17/3089; H04L 67/34; H04L 67/02; H04L 67/10; H04L 67/306
See application file for complete search history.

(56) References Cited

U.S. PATENT DOCUMENTS

| | | | |
|---|---|---|---|
| 8,346,563 B1 | 1/2013 | Hjelm et al. | |
| 8,843,941 B2 * | 9/2014 | Moore | G06F 9/54 719/316 |
| 9,678,723 B2 * | 6/2017 | Itani | G06F 8/36 |
| 9,811,395 B1 * | 11/2017 | Greenwood | G06F 9/541 |
| 9,915,934 B2 * | 3/2018 | Brown | G06F 9/541 |
| 9,930,103 B2 * | 3/2018 | Thompson | G06F 9/541 |

(Continued)

OTHER PUBLICATIONS

Gerken et al., The concept maps method as a tool to evaluate the usability of APIs, 10 pages (Year: 2011).*

(Continued)

*Primary Examiner* — Thuy Dao
(74) *Attorney, Agent, or Firm* — Harrity & Harrity, LLP

(57) ABSTRACT

An example device may include one or more processors to receive an input associated with developing an application; determine a feature that may be included in the application based on the input; select an application programming interface (API) from an API repository, where the API may be associated with the feature of the application; select a user interface (UI) to facilitate user interaction with the application based on the API; and/or perform an action associated with developing the application.

20 Claims, 12 Drawing Sheets

(56) References Cited

U.S. PATENT DOCUMENTS

| | | | |
|---|---|---|---|
| 2002/0033843 A1 | 3/2002 | Loos et al. | |
| 2006/0129972 A1 | 6/2006 | Tyburski et al. | |
| 2008/0109787 A1* | 5/2008 | Wang | G06F 8/33 717/113 |
| 2012/0215543 A1* | 8/2012 | Oz | G06F 3/167 704/275 |
| 2014/0109046 A1 | 4/2014 | Hirsch et al. | |
| 2015/0128103 A1* | 5/2015 | Stratton | G06F 8/00 717/100 |
| 2016/0292018 A1* | 10/2016 | Laredo | G06F 9/54 |
| 2016/0335168 A1* | 11/2016 | Freiberg | G06F 11/3604 |

OTHER PUBLICATIONS

Samet et al., Adapting a map query interface for a gesturing touch screen interface, 4 pages (Year: 2011).*

* cited by examiner

US 10,203,938 B2

APPLICATION ENGINEERING PLATFORM

RELATED APPLICATION

This application claims priority under 35 U.S.C. § 119 to Indian Patent Application No. 201741014165, filed on Apr. 21, 2017, the content of which is incorporated by reference herein in its entirety.

BACKGROUND

Application engineering platforms (AEPs) are platforms that may be used to develop, design, and/or engineer application software for applications (e.g., mobile device applications, computer applications, server applications, enterprise applications, and/or the like). The application software may then be deployed to various devices and/or platforms (e.g., cloud platforms) that are to host applications. Users may then access the host devices to utilize the applications. For example, the applications may facilitate interaction between a user and a backend system of an entity associated with the application.

SUMMARY

According to some implementations, a device may include one or more processors to receive an input associated with developing an application; determine a feature that may be included in the application based on the input; select an application programming interface (API) from an API repository, where the API may be associated with the feature of the application; select a user interface (UI) to facilitate user interaction with the application based on the API; and/or perform an action associated with developing the application.

According to some implementations, a method may include receiving an input associated with developing an application; determining one or more features to be included in the application based on the input; selecting one or more application programming interfaces (APIs) from an API repository, where the one or more APIs may be associated with the one or more features of the application; selecting one or more user interfaces (UI) to facilitate user interaction with the application based on the one or more APIs; and/or performing an action associated with developing the application.

According to some implementations, a non-transitory computer-readable medium storing instructions, the instructions comprising one or more instructions that, when executed by one or more processors, cause the one or more processors to receive an input associated with developing an application; identify a feature that may be included in the application, the feature included in the input; select an application programming interface (API) from an API repository, the API to implement the feature of the application; select a user interface (UI) to facilitate user interaction with the application based on the API; and/or perform an action associated with developing the application.

DETAILED DESCRIPTION

Figure 1:
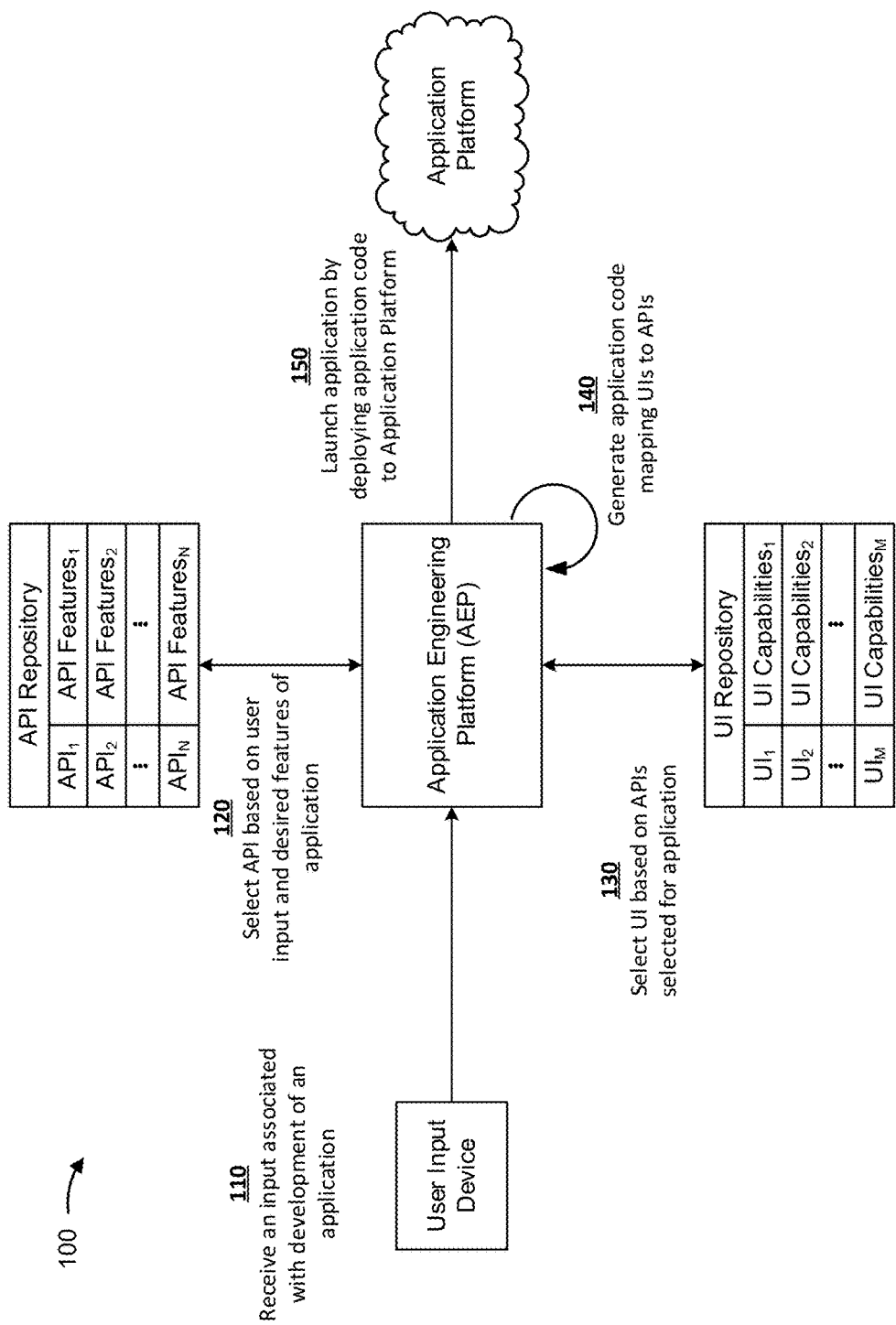
FIG. 1 is a diagram of an overview of an example implementation described herein.

The following detailed description of example implementations refers to the accompanying drawings. The same reference numbers in different drawings may identify the same or similar elements.

An application may use an application programming interface (API) to facilitate communication between a user (via a user interface (UI)) and one or more applications implemented on a backend. In some cases, an API for an application may be selected from a reusable set of APIs during application design. For example, reusing APIs may save significant time during which a programmer would otherwise have to program an API from scratch to interface with the one or more applications.

However, while APIs may improve reusability and efficiency, locating an appropriate API for the situation may be difficult. For example, a user may need to peruse vast API repositories, and come to an understanding of each API, to identify one that is right for the situation. Furthermore, specialized effort (e.g., by a business analyst) may be required to understand user requirements and/or determine which APIs are most suitable to meet such requirements. Still further, manual effort (e.g., by an application developer or business analyst) may not always be sufficient to identify an appropriate API, and business satisfaction may be negatively impacted by usage of a suboptimal API, as application developers or business analysts may make mistakes and/or not necessarily understand requirements of the application to be developed. Further, detecting and/or implementing certain APIs may involve specialized domain skills that may be rare in a particular industry, technology, or development field, and thus, the niche nature of these domain skills could impede the development process due to the lack of available resources (knowledgeable application developers or business analysts).

Some implementations described herein provide an application engineering platform (AEP) for identifying one or more APIs and/or one or UIs to be used when designing an application, overlaying a user interface, developing/deploying an application based on selected API(s) and/or UI(s), automatically generating developer operations and containerization scripts, and capturing API analytical information for the API. Thus, in some implementations, applications created using the AEP may use industry standard APIs to communicate with backend systems (e.g., new or legacy systems). In some implementations, the APIs may include custom developed APIs and/or predefined APIs of an API repository.

In some implementations, the AEP may select an appropriate API and/or UI based on artificial intelligence techniques, such as natural language processing of a message provided by a user, machine learning regarding user preferences for APIs and/or UIs, and/or the like. Further, in some implementations, an application code associated with the selected APIs and/or UIs may be generated and/or deployed. Accordingly, some implementations herein may allow for automated development and/or deployment of an application, thus saving user resources, time, and/or costs to develop the application. In some implementations, suggestions for particular APIs and/or UIs may be provided to the user (e.g. along with requests for approval and/or feedback). Furthermore, an AEP, using some implementations herein, may allow for objective creation of applications, rather than subjective creation of the applications by application developers, thus potentially avoiding human error in development/deployment of the application.

As a particular example, the example AEP, according to some implementations, may be used to design an application for open banking. Open banking is an approach to banking where information associated with banking institutions (e.g., user information, account information, etc.) can be shared through secure APIs so that customers can more effectively manage wealth. Third party application developers may develop applications, services, and/or tools that interface with the secure APIs to provide customers with insights about banking information associated with the customers. In such a case, the AEP may have access to APIs for interacting with banking information from a variety of sources. In some instances, the AEP may identify one or more appropriate APIs for an application designer who is designing an application or service, and may identify one or more corresponding UIs to be implemented in association with the API(s).

In some implementations, the AEP may generate scripts, containers, and/or the like for the application or service to be implemented in a cloud environment, and/or may cause the application or service to be implemented in the cloud environment. In this way, the AEP may improve efficiency of identification of APIs for particular tasks or purposes, and may reduce errors and inefficiency caused by manual selection of inappropriate APIs. Further, the AEP may save time and resources that would otherwise be used to manually program a user interface corresponding to a particular API. Additionally, or alternatively, the AEP may save time and resources that would otherwise be used to manually develop an application or service.

FIG. 1 is a diagram of an overview of an example implementation 100 described herein. As shown in FIG. 1, example implementation 100 may include an application engineering platform (AEP), a user input device, an application programming interface (API) repository, a user interface (UI) repository, and a cloud application platform. According to some implementations, the AEP receives an input associated with development of an application, selects an API based on the input, selects a UI based on the API, generates application code for the application, and deploys the application code to the cloud application platform to host the application.

As further shown in FIG. 1, and by reference number 110, the AEP receives an input associated with development of an application. For example, the AEP may receive the user input from an input device. The input device may include any input device (e.g., a client device, a mobile device, and/or any device that may include an input device, such as a keyboard, mouse, voice recognition system, and/or the like) that facilitates user interaction with the AEP. In some implementations, the input device may include a chat bot that uses natural language processing to analyze audio input (e.g., an audio file, an audio stream, and/or the like) from a user.

As further shown in FIG. 1, and by reference number 120, the AEP selects an API based on user input and desired features of the application (which may be identified in the user input). In some implementations, the AEP may select the API from an API repository, which may include a list of available APIs that may be used for applications and information corresponding to particular features of the APIs. In some implementations, the API repository may correspond to one or more particular types of applications and/or industries. For example, the API repository may correspond to one or more of open banking applications, gaming applications, multimedia applications, social media applications, navigation applications, online shopping applications, and/or the like.

As further shown in FIG. 1, and by reference number 130, the AEP selects a UI based on the APIs that the AEP selected for the application. In some implementations, the AEP may select the UI from a UI repository, which may include a list of available UIs for an application and capabilities of the UIs. In some implementations, the UIs may be associated with other applications (e.g., applications that have been previously developed by the AEP or other AEPs). The UI capabilities may indicate abilities to work with, implement, and facilitate interaction with particular APIs.

As further shown in FIG. 1, and by reference number 140, the AEP generates an application code mapping UIs to the APIs. In some implementations, the application developer may assemble the application code to enable the application (including the selected APIs and/or UIs) to be implemented through execution of the application code. The application code may be assembled using any suitable techniques to incorporate and/or map the selected APIs and/or UIs with/to one another.

As further shown in FIG. 1, and by reference number 150, the AEP launches the application by deploying the application code to an application platform (e.g., a cloud application platform) that may host the application. For example, the application platform may host the application to enable users to access the developed application. In some implementations, the AEP may identify the application platform and/or select the application platform from a plurality of application platforms that host applications (e.g., based on user input). For example, the AEP may select the application platform of FIG. 1 based on characteristics of the application (e.g., a type of the application, APIs of the application, UIs of the application, user preferences, and/or the like).

In this way, the AEP may improve efficiency of identification of APIs for particular tasks or purposes, and may reduce errors and inefficiency caused by the selection of inappropriate APIs. Further, the AEP may save time and resources that would otherwise be used to manually program a user interface corresponding to a particular API. Additionally, or alternatively, the AEP may save time and resources that would otherwise be used to manually implement an application or service in a cloud environment. Additionally, or alternatively, the AEP through artificial intelligence may reduce dependency on rare highly skilled niche individuals that may otherwise be needed to manually implement an application or service in a cloud environment.

As indicated above, FIG. 1 is provided merely as an example. Other examples are possible and may differ from what was described with regard to FIG. 1.

Figure 2:
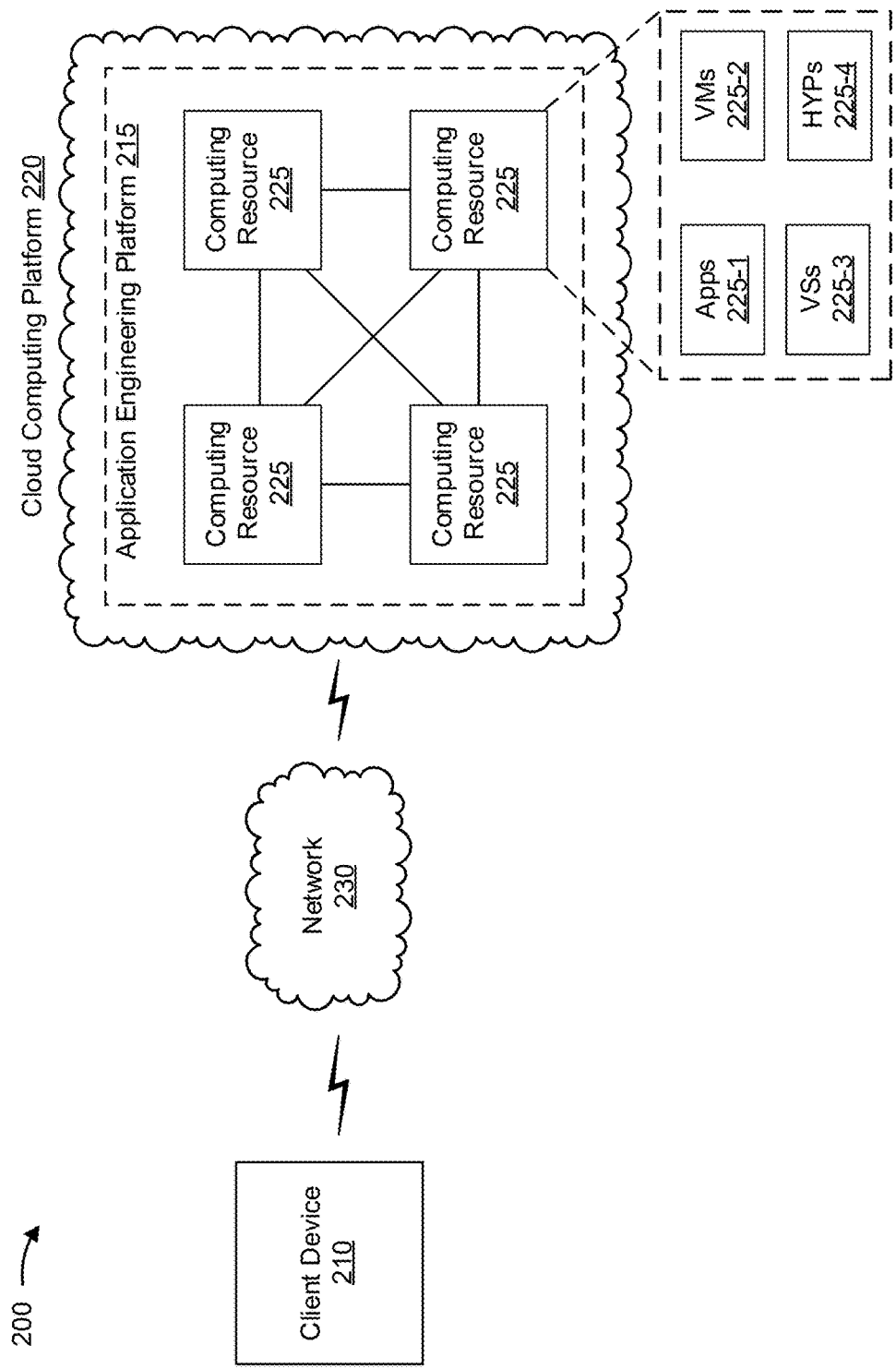
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, an application engineering platform (AEP) 215 hosted within a cloud computing environment 220, and a network 230. Devices of environment 200 may interconnect via wired connections, wireless connections, or a combination of wired and wireless connections.

Client device 210 includes one or more devices capable of receiving, generating, storing, processing, and/or providing information associated with application development. For example, client device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

AEP 215 includes one or more devices capable of developing an application according to some implementations herein. In some implementations, AEP 215 may be capable of developing an application by receiving an input associated with the application, obtaining APIs and/or UIs for the application, and performing an action associated with developing the application. For example, AEP 215 may automatically select the APIs based on features for the application identified in the input, select the UI based on the selected API, generate code (e.g., program code) for the application and/or deploy the application to an application platform. AEP 215, in some implementations, may be included within a studio or suite of application development programs and/or applications.

AEP 215 may include a server device or a group of server devices. In some implementations, AEP 215 may be hosted in cloud computing environment 220. Notably, while implementations described herein may describe AEP 215 as being cloud-based in that AEP 215 is hosted in cloud computing environment 220, in some implementations, AEP 215 may not be cloud-based or may be partially cloud-based.

Cloud computing environment 220 includes an environment that delivers computing as a service, whereby shared resources, services, etc. may be provided to client device 210. Cloud computing environment 220 may provide computation, software, data access, storage, and/or other services that do not require end-user knowledge of a physical location and configuration of a system and/or a device that delivers the services. As shown, cloud computing environment 220 may include (or host) AEP 215 and one or more computing resources 225.

Computing resource 225 includes one or more personal computers, workstation computers, server devices, or another type of computation and/or communication device. In some implementations, computing resource 225 may host AEP 215 (or at least a portion or component of AEP 215). The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by client device 210. Application 225-1 may eliminate a need to install and execute the software applications on client device 210. For example, application 225-1 may include software associated with AEP 215 and/or any other software capable of being provided via cloud computing environment 220. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., client device 210), and may manage infrastructure of cloud computing environment 220, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
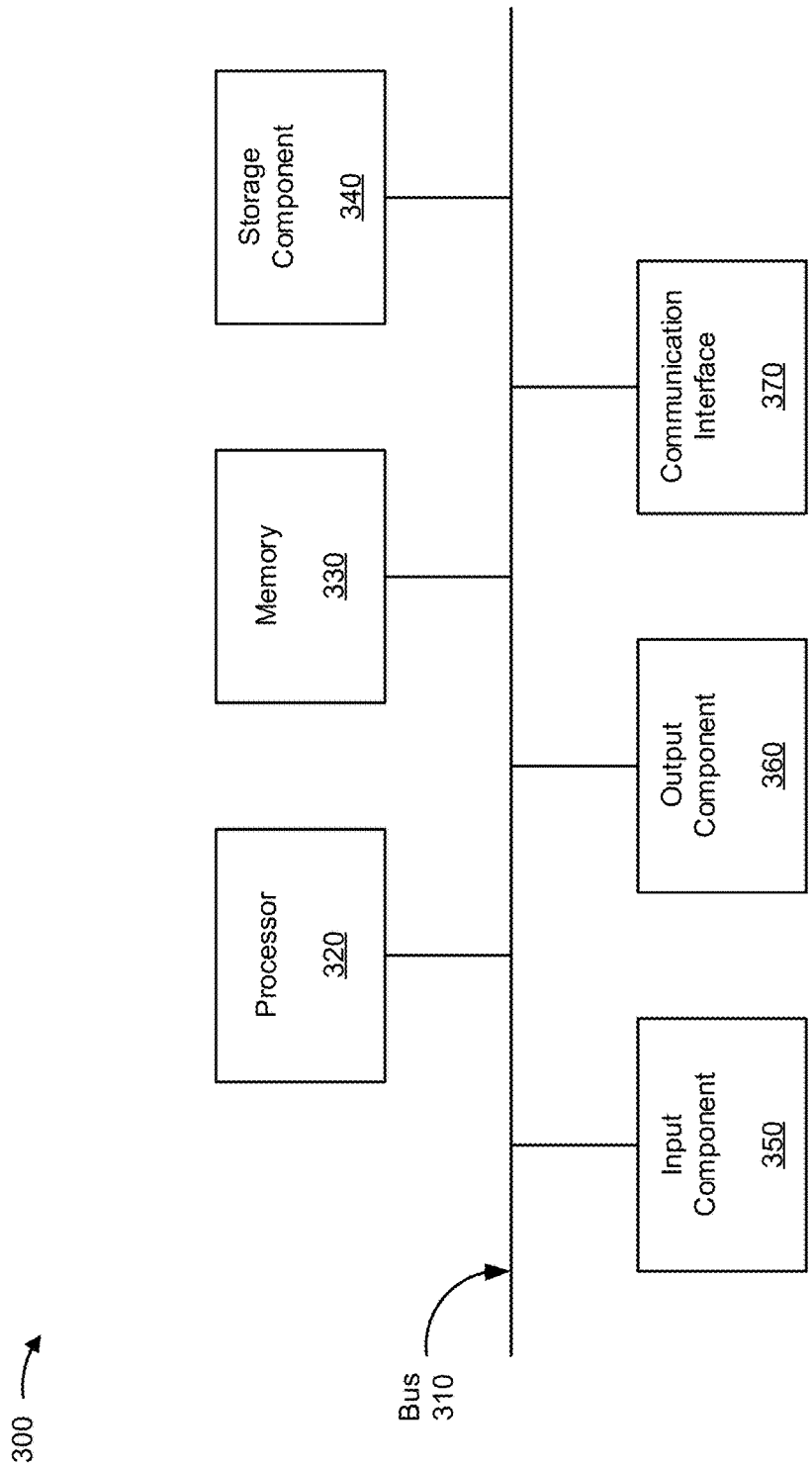
FIG. 3 is a diagram of example components of one or more devices of FIG. 2.

FIG. 3 is a diagram of example components of a device 300. Device 300 may correspond to client device 210 and/or AEP 215. In some implementations, client device 210 and/or AEP 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, an universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
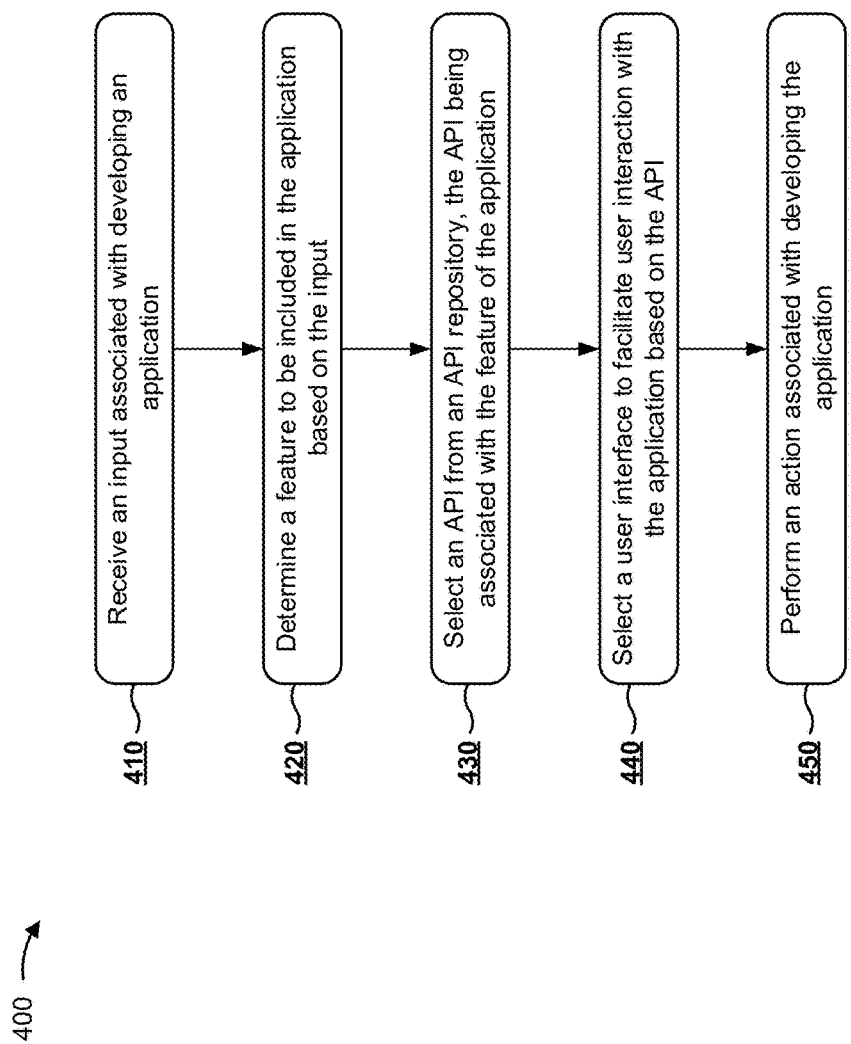
FIG. 4 is a flow chart of an example process associated with developing applications.

FIG. 4 is a flow chart of an example process 400 associated with developing applications. In some implementations, one or more process blocks of FIG. 4 may be performed by AEP 215. In some implementations, one or more process blocks of FIG. 4 may be performed by another device or a group of devices separate from or including AEP 215, such as client device 210.

As shown in FIG. 4, process 400 may include receiving input associated with developing an application (block 410). For example, AEP 215 may receive the input. In some implementations, AEP 215 may receive the input in response to a device or a user (e.g., an application developer) requesting that a particular application be developed and/or instructing the application be developed.

In some implementations, the input may include information indicating that an application is to be developed. The input (or information in the input) may include or describe features that are to be included in the application. As particular examples of features, for a mobile banking application, the features may include an ability to check a banking account balance, to transfer funds, to deposit funds, and/or the like.

In some implementations, the input may be in the form of a message, text, an image, audio, video, and/or the like. Accordingly, in some implementations, the features may be derived from the input using particular keywords of the input, selections or indications of features in the input, images of features in the input, and/or any other suitable information or input representative of features that are to be included in the application.

In some implementations, chat bots (e.g., associated with client device 210 and/or AEP 215) may provide the input to facilitation selection of APIs. The chat bots may utilize language processing to understand the user requests. For example, a user may have access to a list of APIs (e.g., in an API repository) via a chat bot for a particular industry application (e.g., open banking). In some implementations, the user may describe features of the application and/or select APIs for the application from one or more of multiple different lists corresponding to different categories (e.g., basic, advanced, analytics, etc.) using the chat bot. In some implementations, the chat bots may allow the user to inquire about particular APIs for an application of a particular industry.

In some implementations, the chat bot (or chat bot user interface) may provide an overall view of APIs, including identifying newly added APIs, newly created APIs (e.g., from other uses of AEP 215) and/or legacy APIs, as well as corresponding source applications of the APIs, endpoints associated with the APIs, other applications that include or have been built using the APIs, and/or integration architecture for endpoints associated with the APIs. The APIs may be sorted in a user interface of the chat bot (e.g., based on most frequently used APIs, in a chronological order of being added, in an order preferred or associated by a user, and/or the like). Accordingly, AEP 215 may receive input, associated with developing an application, from a chat bot (e.g., which may be implemented by client device 210 and/or AEP 215).

In this way, AEP 215 may receive an input that indicates desired features that are to be included in an application that is to be developed.

As further shown in FIG. 4, process 400 may include determining a feature to be included in the application based on the input (block 420). For example, AEP 215 may determine one or more features to be included in the application based on the input. In some implementations, AEP 215 may determine the features to be in included in the application based on receiving the input associated with developing the application.

In some implementations, a feature may include any characteristic, ability, input, output, process, method, and/or the like that the application is to be able to perform. For example, a feature may include an ability to access, send, manipulate, input, and/or output data associated with the application in particular ways or forms. As a specific example, for an open banking application, a feature may include an ability/process to check a balance of a bank account, transfer funds between accounts, deposit funds, request customer support, shop for banking offers, and/or the like.

In some implementations, AEP 215 may determine features by analyzing and/or identifying information in the input (e.g., based on text analysis, voice analysis/recognition, image analysis, optical character recognition (OCR), and/or the like) and determining features based on the information identified in the input. For example, the input may be parsed, analyzed, and compared with keywords of features of applications and/or APIs.

In some implementations, AEP 215 may utilize artificial intelligence (e.g., AI) to identify features in the input. For example, AEP 215 may utilize an AI engine which may provide natural language processing, deep learning, and/or graphs for machine learning. In some implementations, AEP 215 may combine chat bots (e.g., audio input, text input, selectable input, etc.) with the AI engine to provide a user (e.g., a business user or developer) with a convenient way to express information (e.g., information indicating requested features) such that AEP 215 can determine features to be included in the application. By applying AI, AEP 215 may be able to locate APIs (e.g., in an API repository) with corresponding features in real time by comparing a description of the APIs with the features in the input. This allows for AEP 215 and/or users (e.g., application developers) to narrow down a potentially vast set of APIs to a smaller set of APIs for selection.

In some implementations, AEP 215 may, over a period of time and based on feedback collected, use machine learning to continually improve accuracy of an AI engine used to select APIs and/or reduce user intervention. Accordingly, AEP 215 may automatically determine features that are to be included in the application from the input.

In this way, AEP 215 may determine features to be included in the application to identify and/or select corresponding APIs for the application to implement the features.

As further shown in FIG. 4, process 400 may include selecting an API from an API repository, the API being associated with the feature of the application (block 430). For example, AEP 215 may select one or more APIs from one or more API repositories. In some examples, AEP 215 may select the API based on receiving the input and/or determining the features of the input.

According to some implementations, an API may provide a set of clearly defined methods of communication between various software components of an application and/or may include a set of subroutine definitions, protocols, and/or tools for building an application. For example, APIs may be mechanisms that the application, when under operation, uses to implement the features identified in the input. As a specific example, for a feature that is to enable a user to access a bank account via an open banking application, one or more APIs may implement that feature by processing the request, making calls to a backend system hosting account information of the account, obtaining the account information, and providing the account information to the user.

In some implementations, AEP 215 may select the APIs from the API repository by cross-referencing the identified features in the input with features and/or characteristics of APIs indicated in the API repository. For example, an API may be selected from the API repository when features of the API match or satisfy a match threshold of features described in or determined from the input. According, AEP 215 may cross-reference a feature of the input with respective features of a plurality of APIs in the API repository and select the API form the plurality of APIs when the According to some implementations, an API repository may be any data structure (e.g., a list, a table, a database, an index, a task graph, and/or the like) that stores APIs and information corresponding to features and/or characteristics of the APIs. In some implementations, AEP 215 may track/store selections of APIs by AEP 215 for machine learning purposes. For example, when an API is selected from the API repository based on features determined from an input, AEP 215 may determine whether the selected API was used in the developed application and/or how the API performed in the developed application for those particular features (e.g., did the API cause errors, packet or data loss, performance degradation, and/or the like). Accordingly, when selecting APIs for subsequent developments of applications with the same or similar features as identified in the input, AEP 215 may make selections based on machine learning indicating APIs are associated with the identified features (e.g., using and/or considering information corresponding previous selections of APIs).

In some implementations, AEP 215 may obtain user input (e.g., via a chat bot) and may perform natural language processing (e.g., via an AI engine) to process the user input and provide a result of processing the user input to a deep learning tool, which may provide one or more APIs that satisfy a match threshold. In some implementations, AEP 215 may make a selection of an API and/or obtain a user selection of an API (e.g., via a chat bot) and may provide the selection to a graphical database, which may store the selected API and act as a self-learning mechanism. Thereafter, upon subsequent user inputs (by a same or different user) that include a same combination of words, AEP 215 may provide a best match API and/or other alternatives, and may also provide the user selection. Accordingly, AEP 215 may select an API associated with features of the application.

In this way, AEP 215 may select an API that may enable AEP 215 to select a user interface to facilitate user interaction with the application based on the API.

As further shown in FIG. 4, process 400 may include determining a user interface to facilitate user interaction with the application based on the API (block 440). For example, AEP 215 may select one or more UIs to facilitate user interaction with the application. In some implementations, AEP 215 may select the user interface based on the API being selected, based on the API being indicated by the input, and/or based on the input of the user indicating a corresponding UI.

According to some implementations, a UI includes an interface (e.g., a graphical user interface) that enables a user to interact with an application. Example UIs may include particular output mechanisms and/or input mechanisms for the application. For example, UIs may include one more presentations (e.g., images, graphs, text, videos, slides, etc.) and/or inputs (e.g., buttons, text fields, search fields, dropdowns, selectable buttons, check boxes, etc.) to enable a user to interact with the application. As a specific example, a user interface of an open banking application may include a presented table showing a transaction history of a bank account or a menu to switch between accounts or features of the application.

In some implementations, a user interaction may involve a user's ability to view, access, and/or manipulate an application. Accordingly, a user interaction may include a user viewing a presentation of the application, providing input associated with the application, changing a format of the application, and/or the like.

According to some implementations, AEP 215 selects one or more UIs for one or more APIs that are to be included in the application. In some implementations, the UIs are a selected based on features or characteristics of selected APIs. For example, a UI may be selected based on an ability of the UI to facilitate user interaction with a particular API. In some implementations, AEP 215 may map the UIs to the APIs (or vice versa). Accordingly, one or more UIs may be selected to enable a user to interact with the application to implement/execute the APIs. In some implementations, a UI may be selected based on an input from a user. For example, a user may provide an image (e.g., a screenshot of a program, a video still of a UI, a scanned diagram, and/or the like) associated with a UI design, or describe (e.g., verbally through a chat bot) features of a UI design that are to be used in association with selected APIs. Accordingly, AEP 215 may obtain a captured image (e.g., a hand drawing, a printed illustration, etc.) of a UI (e.g., by a camera, scanner, etc.) and may match the captured image to identify one or more UIs in the UI repository.

In some implementations, AEP 215 may utilize AI and/or machine learning to determine one or more UIs for the APIs that have been selected. For example, AEP 215 may apply AI to identify UI templates that match selected APIs. In this case, AEP 215 may thereafter provide UI information (e.g., videos) to a user device (e.g., client device 210). In some implementations, AEP 215 may select the identified UIs, or provide the identified UIs to the user device.

In this way, AEP 215 may select one or more UIs to facilitate user interaction with an application based on selected APIs of the application.

As further shown in FIG. 4, process 400 may include performing an action associated with developing the application (block 450). For example, AEP 215 may perform the one or more actions. In some implementations, AEP 215 may perform the action based on selecting the APIs and/or UIs for the application and/or based on receiving the input. AEP 215 may perform actions including providing a notification to a user, generating a code for the application, deploying the application, tracking the application deployment (e.g., operability, errors associated with operation, and/or the like), performing service integration, and/or the like.

In some implementations, example actions may include notifying a user of selected APIs/UIs (e.g., including generating a preview of the application, such as images/snapshots of the application, for the user). For example, AEP 215 may notify the user via client device 210 and/or may generate a preview for display via client device 210. In some implementations, AEP 215 may provide the notification and/or preview in the form of a report, a prompt, or the like. In some implementations, AEP 215 may request approval of a developed application and/or approval to generate application code and/or deploy the application code to an application platform.

In some implementations, AEP 215 may perform an action to automatically generate application code for the application. For example, AEP 215 may map selected UIs to selected APIs to generate the application code. In this case, AEP 215 may automatically generate containers and/or scripts for the application based on the selected APIs and/or UIs. For example, AEP 215 may map features/capabilities of the APIs to features/capabilities of UIs that may facilitate interaction with the APIs. Accordingly, AEP 215 may provide an end-to-end application that is ready for deployment.

In some implementations, AEP 215 may perform an action to automatically deploy generated application code (e.g., using a development operation automation) for the application (e.g., to an application platform). For example, AEP 215 may deploy the application code to an application platform that is to host the application by executing the application code. In some implementations, AEP 215 may provide and/or select one or more deployment topologies corresponding to multiple cloud providers (e.g., particular web service providers and/or the like). In this case, AEP 215 may select a particular deployment topology based on characteristics of the application and/or compatibility with the cloud providers and/or may provide topology information (e.g., videos) to obtain a selection of a particular topology (e.g., via client device 210).

In some implementations, AEP 215 may perform an action to monitor applications (or operation of applications) and/or the selected APIs in the application for analytics and/or machine learning purposes. For example, AEP 215 may detect usage of various APIs, generate analytics information, and provide automated visualization of the API usage during operation of the application (e.g., when the application costed by an application platform). For example, AEP 215 may provide a map of APIs and related information across various geographical regions, countries, times, application names, and/or the like.

As an example, as APIs are executed, AEP 215 may perform an action to record the data exchanges in a variety of databases (e.g., in-memory overlap databases and/or the like). Based on the recorded data exchanges, AEP 215 may generate analytics on API usage, and may also derive secondary analytics on user preferences and/or provide a platform on which surveillance or compliance related features may be built. In some implementations, the databases may be accessed through visualization tools (e.g., of an interface of AEP 215) in order to provide visibility and real-time analytics.

In some implementations, AEP 215 may perform an action to enable service integration of the deployed applications. For example, APIs may be serviced through back-end services that use batch mode and/or real-time integration with legacy applications. In this case, the integration with legacy applications may be through a database, a file system, messaging, and/or web services.

In some implementations, AEP 215 may perform an action to enable mechanisms to connect to legacy applications through messaging and/or extracting legacy application data periodically into a database. For example, a messaging layer and a database layer may then be integrated with the database that is leveraged for servicing the APIs.

In this way, AEP 215 may perform an action associated with developing an application that allows for automated development of the application.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
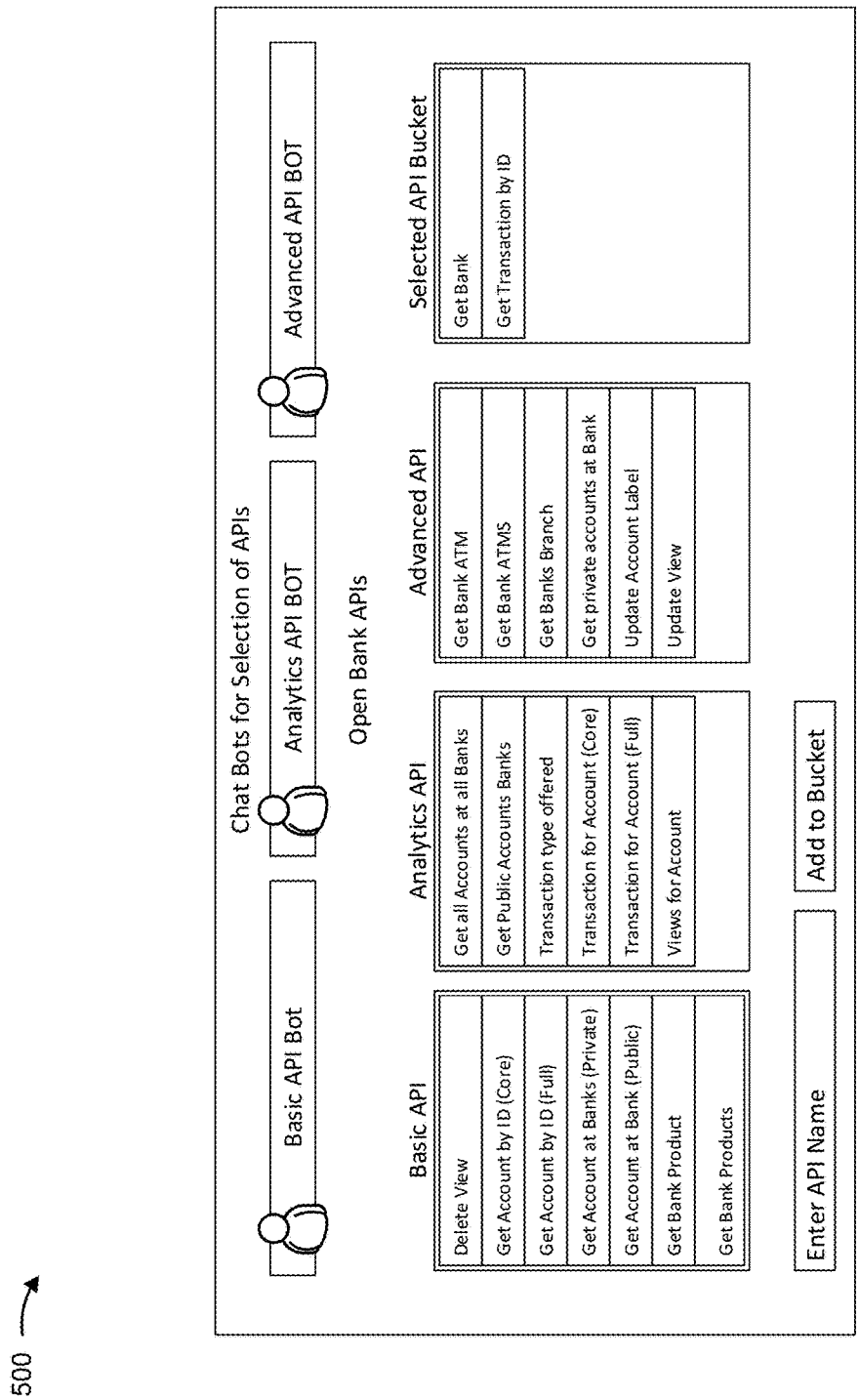
FIG. 5 is a diagram of an example implementation relating to the example process shown in FIG. 4.

FIG. 5 is a diagram of an example implementation 500 relating to example process 400 shown in FIG. 4. FIG. 5 shows an example associated with developing applications. For example, FIG. 5 shows an example implementation 500 of a platform (e.g., a user interface) to receive user input (e.g., via a chat bot). As shown in FIG. 5, example implementation 500 may include a UI of a chat bot for providing information associated with an application and/or making custom selections of APIs. The chat bot may include a basic API bot, an analytics API bot, and/or an advanced API bot.

As further shown in FIG. 5, the UI may include a list of APIs for a particular industry application, such as open banking. The example UI of example implementation 500 allows the user to select APIs from one or more of multiple different lists corresponding to different categories (e.g., basic, advanced, analytics, etc.). In some implementations, the chat bots may allow the user to inquire about particular APIs (e.g., by entering an API name, as shown). In some implementations, the selected API bucket may show APIs selected by a user and/or APIs selected by AEP 215 based on input received through the chat bot of example implementation 500.

As indicated above, FIG. 5 is provided merely as an example. Other examples are possible and may differ from what was described with regard to FIG. 5.

Figure 6:
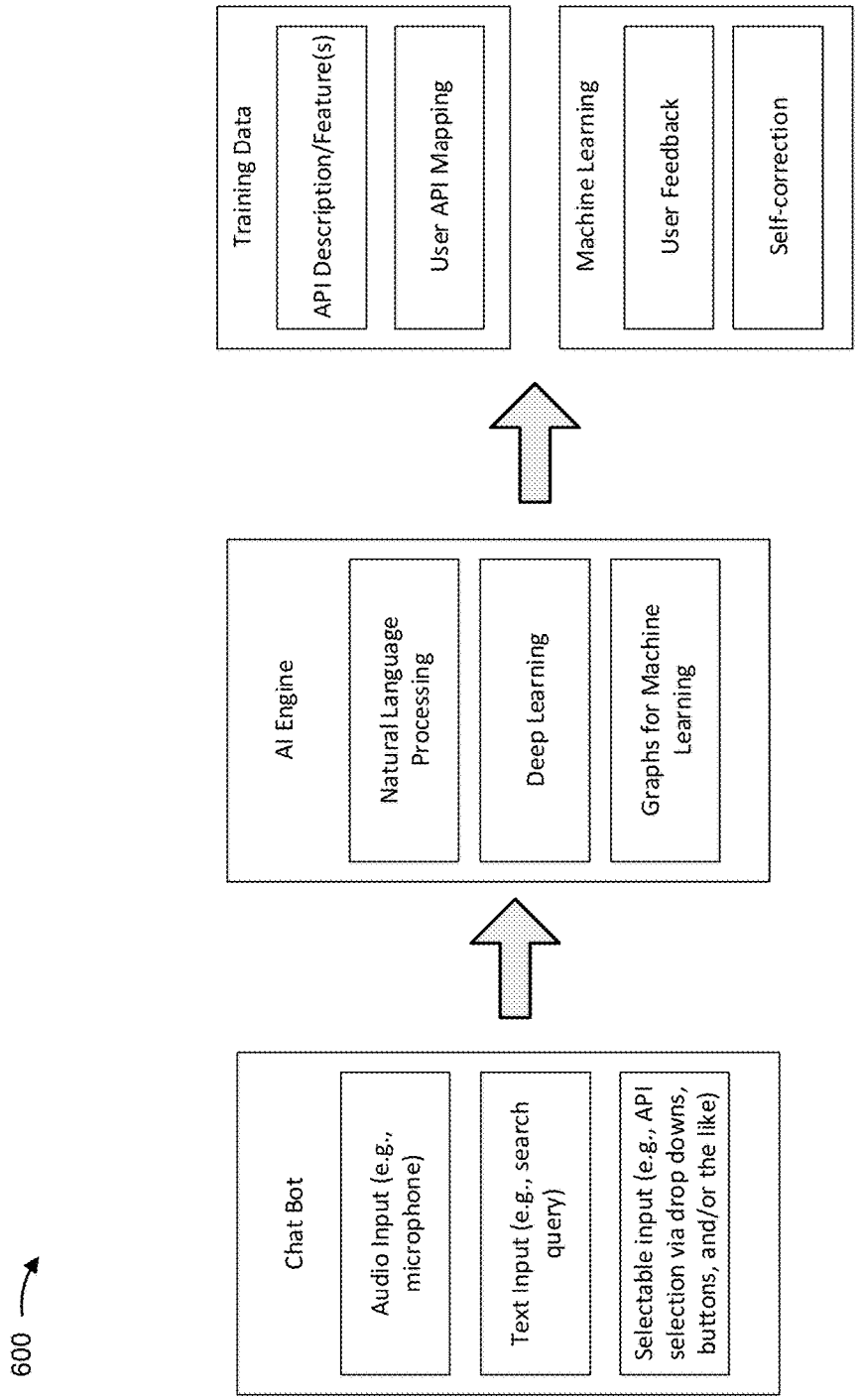
FIG. 6 is a diagram of an example implementation relating to the example process shown in FIG. 4.

FIG. 6 is a diagram of an example implementation 600 relating to example process 400 shown in FIG. 4. FIG. 6 shows an example associated with developing applications. For example, FIG. 6 shows an example implementation 600 of an architecture of AEP 215 that may enable AEP 215 to identify one or more features and/or APIs for an application to be developed based on an input and to implement machine learning to identify the features and/or APIs in the input and/or in a subsequently received input for development of a subsequent application.

As shown in FIG. 6, example implementation 600 includes a chat bot and an AI engine that develops training data and/or facilitates machine learning. In FIG. 6, the chat bot may provide an audio input, a text input, a selectable input, and/or the like to the AI engine. The example AI engine may utilize natural language processing, deep learning, and/or graphs for machine learning to produce training data and/or facilitate machine learning. The example training data may include a determined API description and/or feature(s) and/or a user API mapping, and the example machine learning may be facilitated through user feedback (e.g., whether identified APIs are selected or used for the application) and/or self-correction (whether AEP 215 selects or uses identified APIs).

As indicated above, FIG. 6 is provided merely as an example. Other examples are possible and may differ from what was described with regard to FIG. 6.

Figure 7:
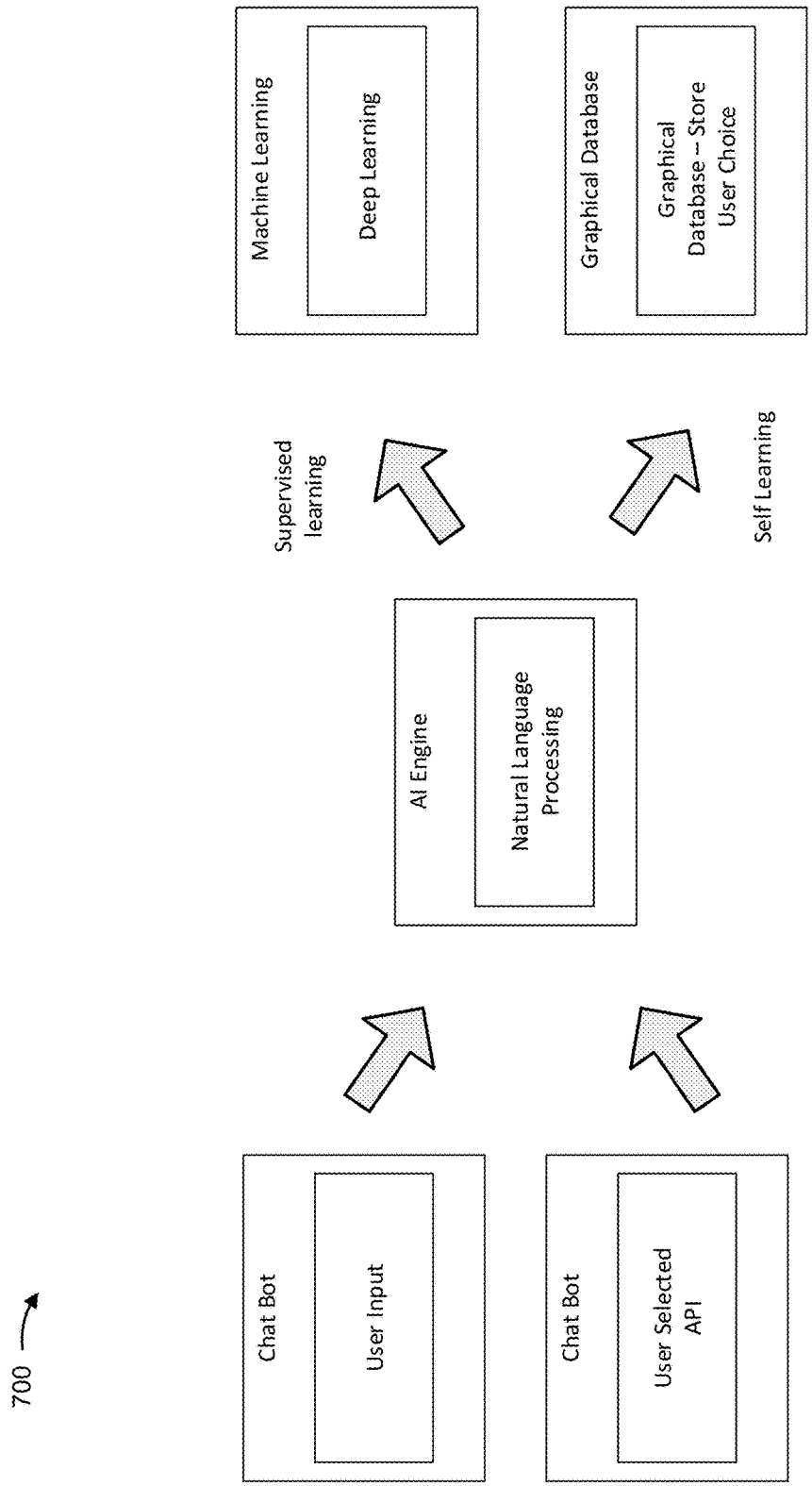
FIG. 7 is a diagram of an example implementation relating to the example process shown in FIG. 4.

FIG. 7 is a diagram of an example implementation 700 relating to example process 400 shown in FIG. 4. FIG. 7 shows an example associated with developing applications. For example, FIG. 7 shows an example implementation 700 of an architecture of AEP 215 for tracking/storing API identification/selection for machine learning purposes.

As shown in FIG. 7, example implementation 700 includes a chat bot that obtains user input, a chat bot that obtains user selected APIs, and an AI engine that facilitates machine learning and/or provides the user selected APIs to a graphical database. The example AI engine may utilize natural language processing for API identification. Additionally, or alternatively, the machine learning may be facilitated (e.g., through supervised learning) using deep learning based on identified APIs. Furthermore, a graphical database, through self-learning, may utilize a graphical database to store a user-choice. In some implementations, the machine learning/deep learning element of example implementation 700 may interact or access the graphical database for machine learning purposes.

As indicated above, FIG. 7 is provided merely as an example. Other examples are possible and may differ from what was described with regard to FIG. 7.

Figure 8:
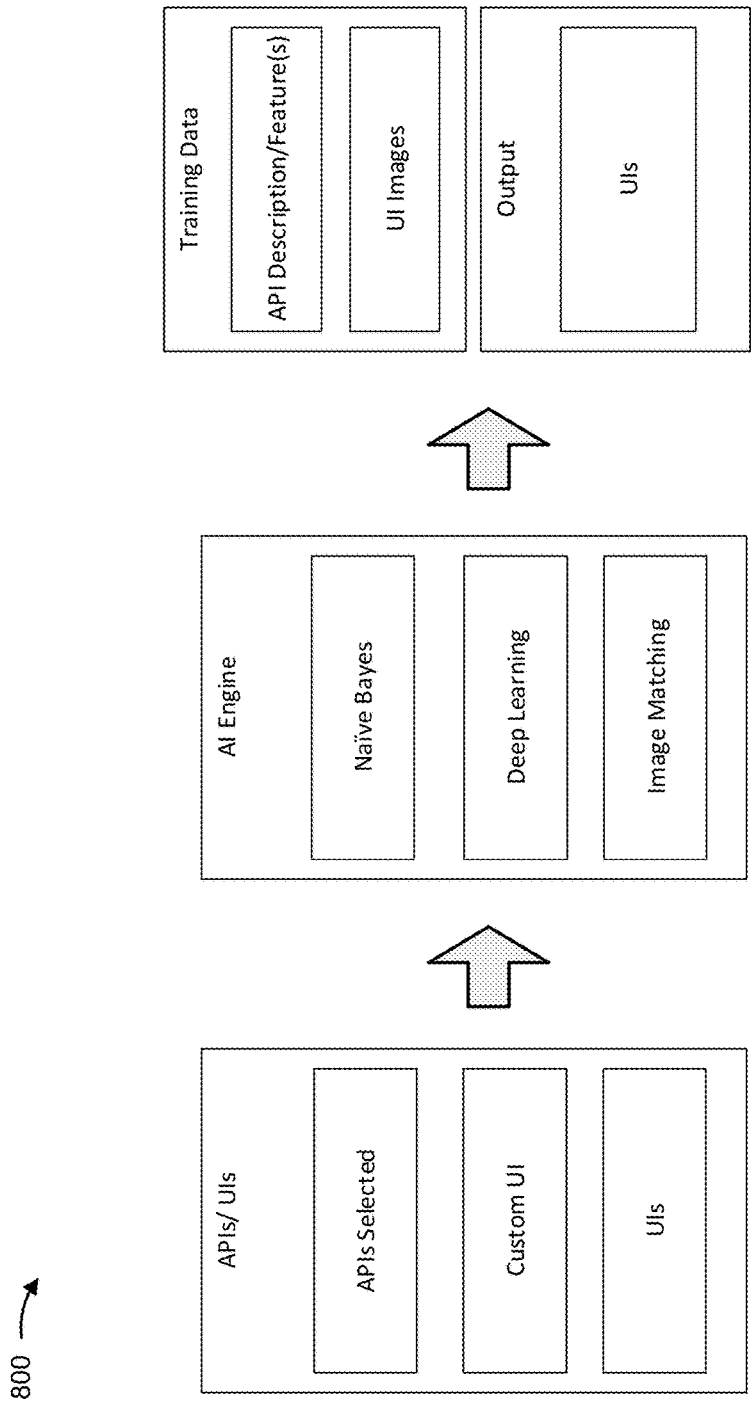
FIG. 8 is a diagram of an example implementation relating to the example process shown in FIG. 4.

FIG. 8 is a diagram of an example implementation 800 relating to example process 400 shown in FIG. 4. FIG. 8 shows an example associated with developing applications. For example, FIG. 8 shows an example implementation 800 of an architecture of AEP 215 to facilitate selecting UIs and corresponding machine learning for selection of UIs.

As shown in FIG. 8, example implementation 800 includes an AI engine which may receive APIs/UIs (including one or more of selected APIs), custom UIs (e.g., provided by a user, such as via an image captured by a camera), and/or selected UIs. As shown in FIG. 8, the AI engine may utilize a Naïve Bayes analysis, deep learning, and/or image mapping for UI selection and/or corresponding machine learning. The example AI engine may utilize AI to determine a UI that matches selected APIs, and may produce training data (e.g., for machine learning) and an output. Further, as shown in the example implementation 800, the AI engine the training data may include an API description and/or feature(s) and UI images, while the output provides selected UIs.

As indicated above, FIG. 8 is provided merely as an example. Other examples are possible and may differ from what was described with regard to FIG. 8.

Figure 9:
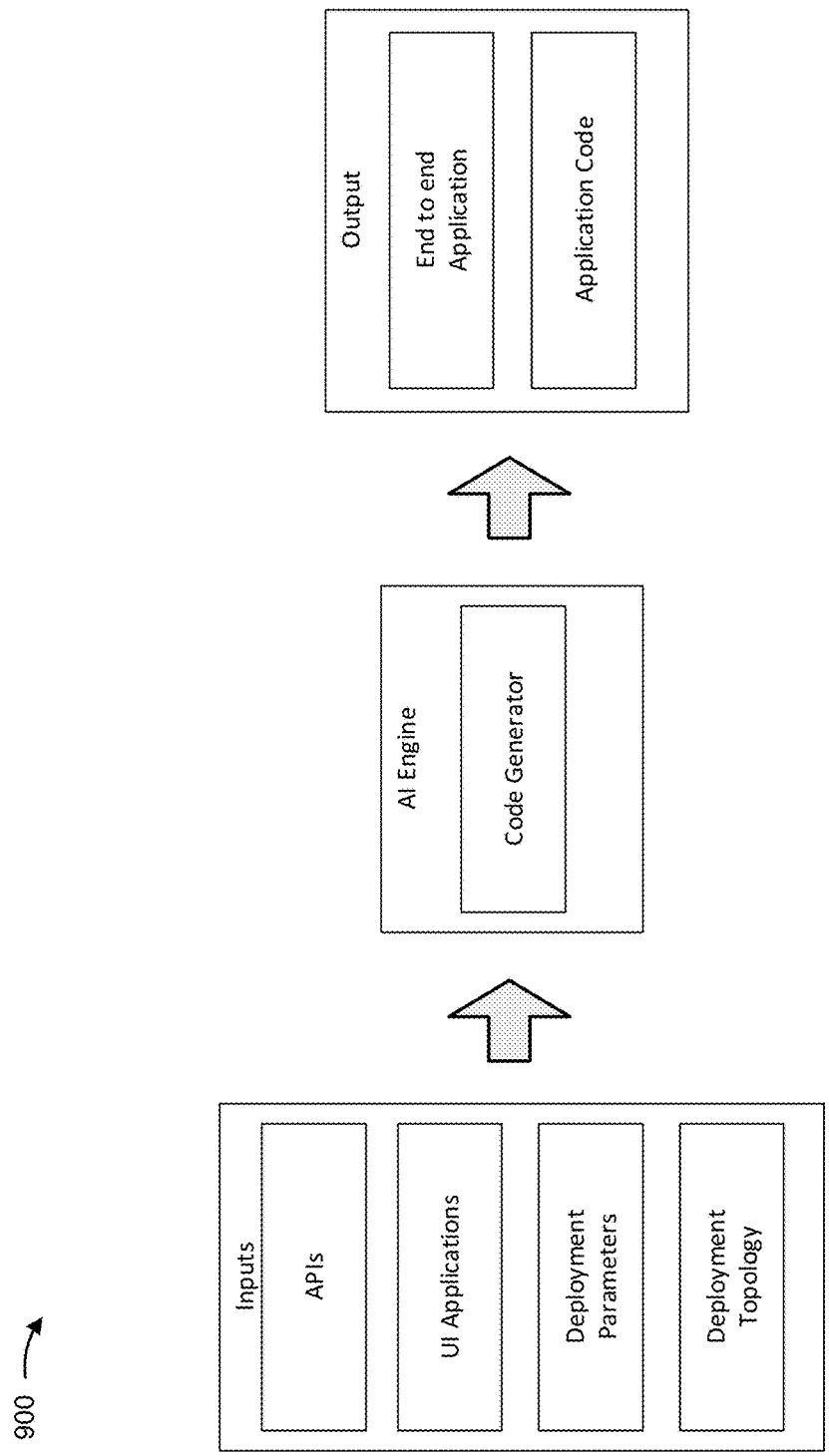
FIG. 9 is a diagram of an example implementation relating to the example process shown in FIG. 4.

FIG. 9 is a diagram of an example implementation 900 relating to example process 400 shown in FIG. 4. FIG. 9 shows an example associated with developing applications. For example, FIG. 9 shows an example implementation 900 of an architecture of AEP 215 that may facilitate generation (e.g., automated generation) of application code for an application.

As shown in FIG. 9, example implementation 900 includes an AI engine that may receive inputs (e.g., APIs, UI applications, deployment parameters, and/or deployment topology), and may automatically generate application code (e.g., using a code generator) that maps selected UIs to selected APIs. The example AI engine may provide outputs, such as an end-to-end application and/or application code.

As indicated above, FIG. 9 is provided merely as an example. Other examples are possible and may differ from what was described with regard to FIG. 9.

Figure 10:
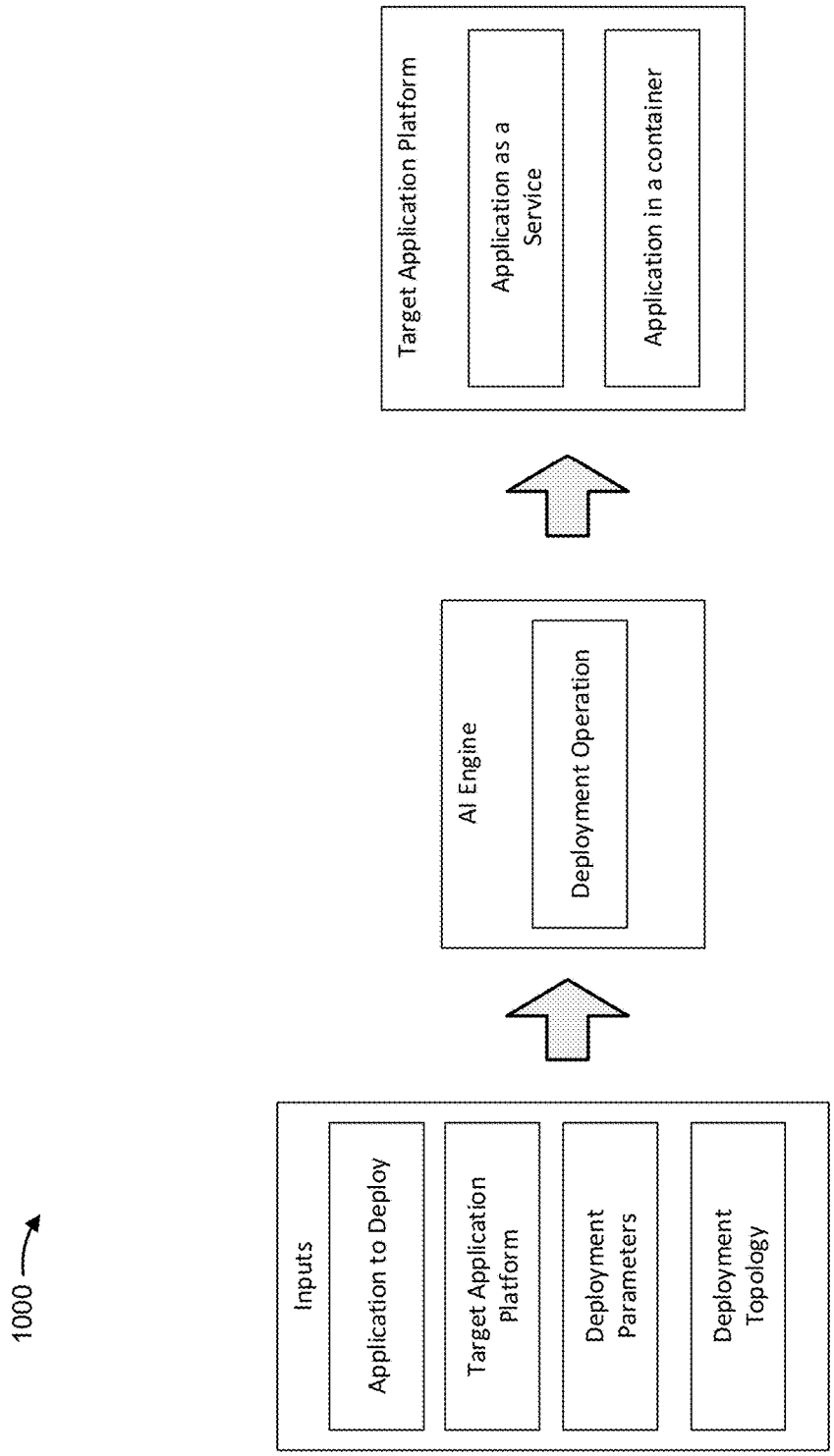
FIG. 10 is a diagram of an example implementation relating to the example process shown in FIG. 4.

FIG. 10 is a diagram of an example implementation 1000 relating to example process 400 shown in FIG. 4. FIG. 10 shows an example associated with developing applications. For example, FIG. 10 shows an example implementation 1000 of an architecture of AEP 215 for deployment (e.g., automated deployment) of an application to an application platform.

As shown in FIG. 10, example implementation 1000 includes an AI engine that receives inputs (e.g., an application to deploy, a target cloud platform, deployment parameters, and/or deployment topology), and performs a deployment operation (e.g., DevOps). The example AI engine deploys the application to a target application platform (e.g., a cloud platform, a web-service platform, and/or the like). As shown in example implementation 1000, the application may deployed as a service or within a container of the target application platform.

As indicated above, FIG. 10 is provided merely as an example. Other examples are possible and may differ from what was described with regard to FIG. 10.

Figure 11:
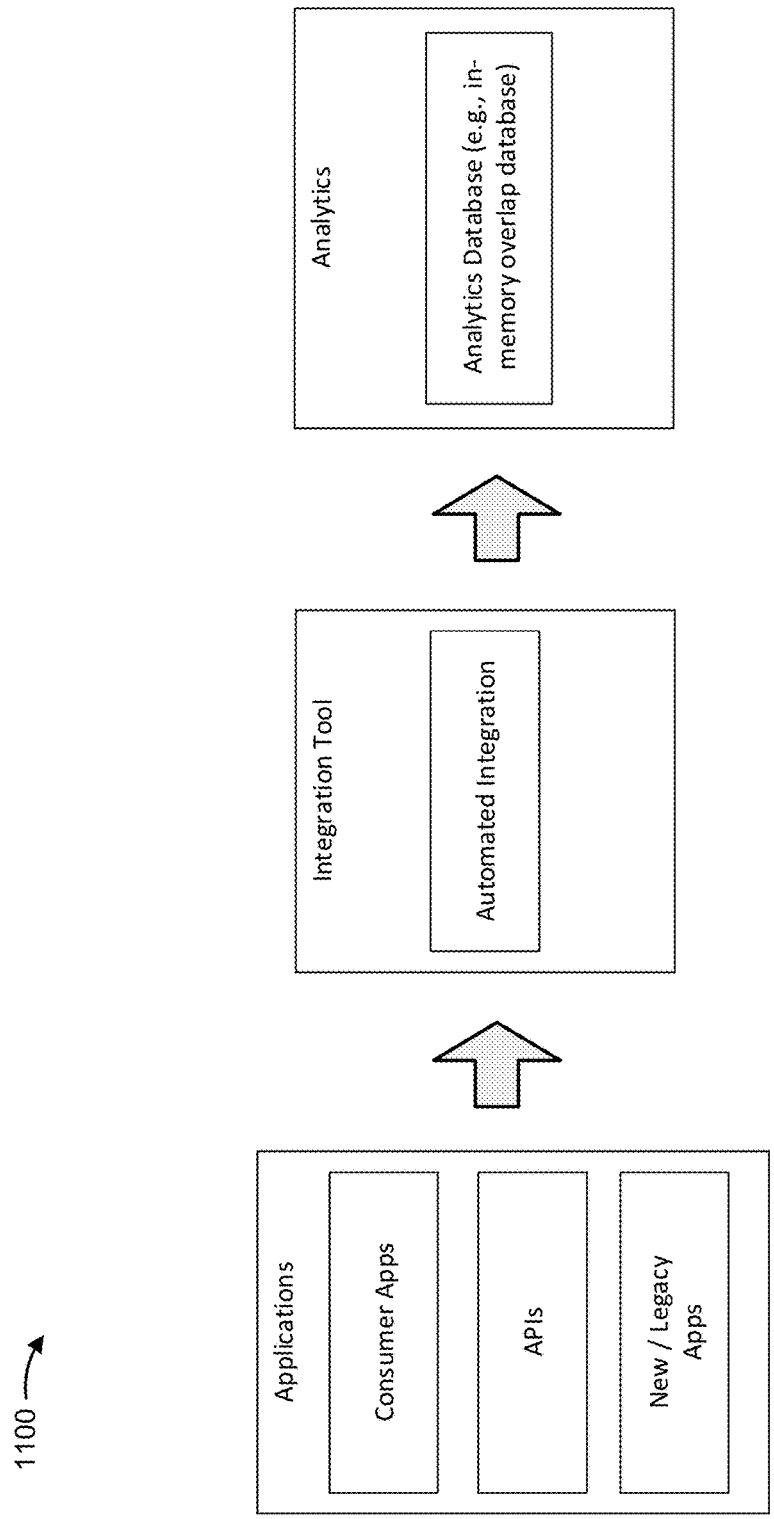
FIG. 11 is a diagram of an example implementation relating to the example process shown in FIG. 4.

FIG. 11 is a diagram of an example implementation 1100 relating to example process 400 shown in FIG. 4. FIG. 11 shows an example associated with developing applications. For example, FIG. 11 shows an example implementation 1100 of an architecture of AEP 215 for tracking and/or monitoring deployed applications and/or APIs of applications.

As shown in FIG. 11, example implementation 1100 includes an integration tool that receives application information (e.g., consumer applications, APIs, new/legacy applications, etc.), and generates analytics information based on the deployment of the applications. The example integration tool may provide analytics information to an analytics database (e.g., an in-memory overlap database). In some implementations, the integration tool may determine performance characteristics and/or usage characteristics of applications, APIs of applications, and/or the like. In some implementations, the analytics database may be used for machine learning purposes that may accessible to AEP 215 when selecting APIs and/or UIs.

As indicated above, FIG. 11 is provided merely as an example. Other examples are possible and may differ from what was described with regard to FIG. 11.

Figure 12:
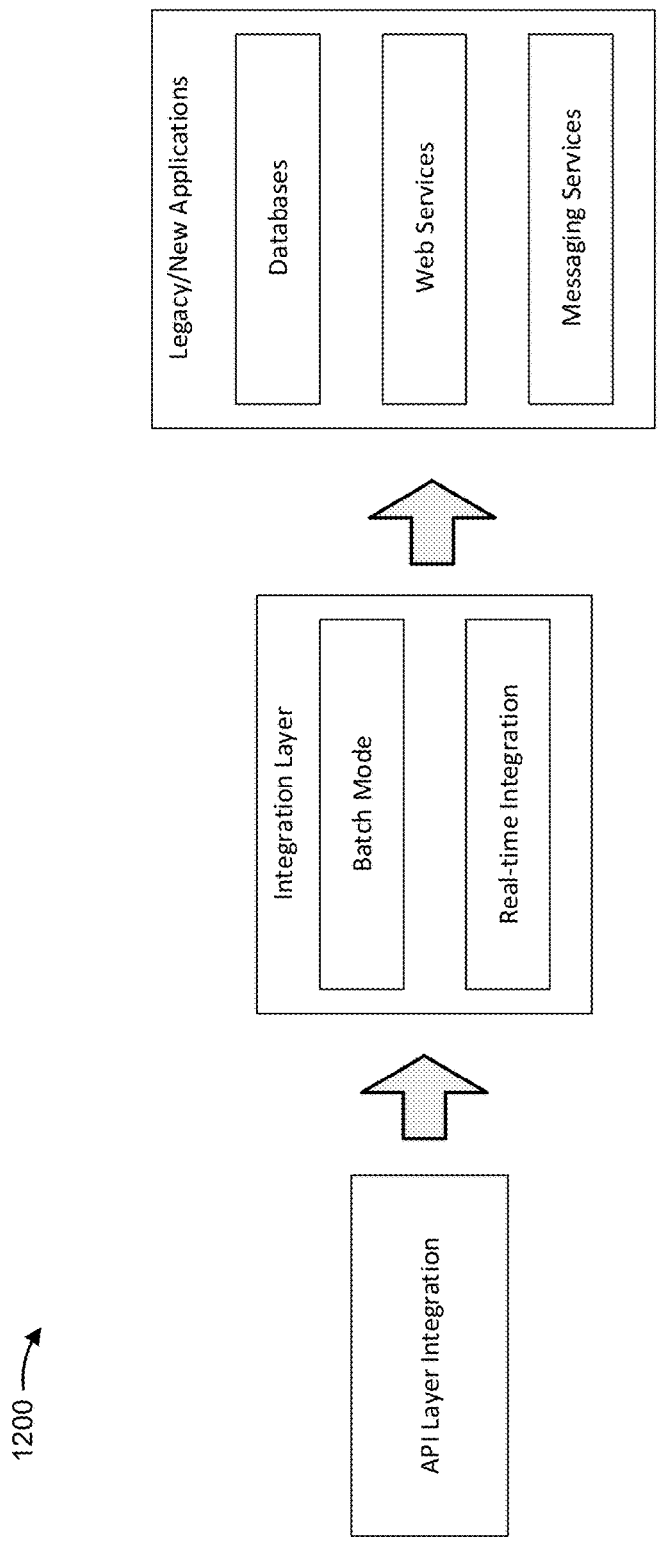
FIG. 12 is a diagram of an example implementation relating to the example process shown in FIG. 4.

FIG. 12 is a diagram of an example implementation 1200 relating to example process 400 shown in FIG. 4. FIG. 12 shows an example associated with developing applications. For example, FIG. 12 shows an example implementation 1200 of an architecture of AEP 215 that may facilitate service integration of a developed application.

As shown in FIG. 12, example implementation 1200 includes an integration layer that receives API layer integration information, and performs batch mode and/or real-time integration of the application and/or APIs of the application. The example integration layer integrates the API layer information with legacy/new applications, such as databases, web services, and/or messaging services.

As indicated above, FIG. 12 is provided merely as an example. Other examples are possible and may differ from what was described with regard to FIG. 12.

Some implementations described herein provide an AEP for identifying an API to be used in development of an application, overlaying a user interface (e.g., a user interface corresponding to the API), and performing an action associated with developing the application (e.g., generating application code for the application, generating developer operations and/or containerization scripts for deployment of the application, capturing API analytics information for the application, and/or the like). Further, applications developed using the AEP may use industry standard APIs and/or custom APIs of an API repository to communicate with backend systems (e.g., new or legacy systems). For example, the APIs may include predefined APIs of an API repository.

In some implementations, the AEP may select an appropriate API based on artificial intelligence techniques, such as natural language processing of a message or audio received from a user, machine learning regarding user preferences for APIs, and/or the like. Accordingly, some implementations herein may allow for automated development and/or deployment of an application, thus saving user resources, time, and costs to develop the application. In some implementations, suggestions for particular APIs and/or UIs may be provided to the user. Furthermore, application development, using some implementations herein, may allow for objective creation of applications, rather than subjective creation of the applications, thus potentially avoiding human error in the development/deployment of the application.

As a particular example, the AEP may be used to design applications in an open banking context. Open banking is an approach to banking where information associated with banking institutions (e.g., user information, account information, etc.) can be shared through secure APIs so that customers can more effectively manage wealth. Third party application developers may develop applications, services, and/or tools that interface with the secure APIs to provide customers with insights about banking information associated with the customers. In such a case, the AEP may have access to APIs for interacting with banking information from a variety of sources. The AEP may identify an appropriate API for an application designer who is designing an application or service, and may identify a user interface to be implemented in association with the API.

In some implementations, the AEP may generate scripts, containers, and/or the like for the application or service to be implemented in a cloud environment, and/or may cause the application or service to be implemented in the cloud environment. In this way, the AEP may improve efficiency and relevance of identification of APIs for particular tasks or purposes, and may reduce errors and inefficiency caused by the selection of inappropriate APIs. Further, the AEP may save time and resources that would otherwise be used to manually program a user interface corresponding to a particular API. Additionally, or alternatively, the AEP may save time and resources that would otherwise be used to manually implement an application or service in a cloud environment.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, an input associated with developing an application;
determining, by the device, one or more features to be included in the application based on the input;
selecting, by the device, one or more application programming interfaces (APIs) from an API repository, the one or more APIs being associated with the one or more features of the application;
selecting, by the device, one or more user interfaces (UI) to facilitate user interaction with the application based on the one or more APIs; and
performing, by the device, an action associated with developing the application,
the action including deployment of application code for the application to an application platform,
the application code mapping the one or more APIs to the one or more UIs, and
the application platform to host the application by executing the application code.

2. The method of claim 1, where selecting the one or more APIs further comprises:
utilizing machine learning to analyze the one or more features and identify the one or more APIs in the API repository.

3. The method of claim 1, where selecting the one or more UIs further comprises:
utilizing machine learning to analyze the one or more APIs and identify the one or more UIs in a UI repository.

4. The method of claim 1, where selecting the one or more UIs further comprises:
analyzing the input to identify features of the one or more UIs,
the input comprising an image of a UI design; and
selecting the one or more UIs based on the image of the UI design.

5. The method of claim 1, where performing the action comprises:
generating application code for the application based on the one or more APIs and the one or more UIs,
the application code to implement the application when executed by the application platform.

6. The method of claim 1, further comprising:
monitoring the application when hosted by the application platform to produce training data for machine learning, the training data to be used in developing a subsequent application.

7. The method of claim 1, where determining the one or more features comprises:
performing natural language processing on the input to identify a keyword associated with the one or more features and/or the one or more APIs.

8. A device, comprising:
one or more processors, implemented at least partially in hardware, to:
receive an input associated with developing an application;
determine a feature to be included in the application based on the input;
select an application programming interface (API) from an API repository,
the API being associated with the feature of the application;
select a user interface (UI) to facilitate user interaction with the application based on the API; and
perform an action associated with developing the application,
the action including generation of an application code, for the application, to map the UI to the API.

9. The device of claim 8, where the one or more processors, when determining the feature, are further to:
perform natural language processing on the input to identify a keyword associated with the feature and/or the API,
the input comprising an audio input.

10. The device of claim 8, where the one or more processors, when selecting the API, are further to:
cross-reference the feature with respective features of a plurality of APIs in the API repository; and
select the API from the plurality of APIs when the feature satisfies a match threshold with at least one of the respective features of the plurality of APIs.

11. The device of claim 8, where the one or more processors, when selecting the UI are further to:
identify the UI based on an ability of the UI to facilitate user interaction with the API; and
select the UI from a UI repository based on the ability of the UI to facilitate user interaction with the API.

12. The device of claim 8, where the one or more processors, when performing the action, are to:
send a notification indicating the API and UI were selected for the application.

13. The device of claim 8, where the one or more processors, when performing the action are to:
deploy the application code to an application platform, the application platform to host the application by executing the application code.

14. The device of claim 8, where the one or more processors, when selecting the API, are further to:
utilize machine learning to analyze the feature and identify the API in the API repository.

15. The device of claim 8, where the one or more processors, when selecting the UI, are further to:
utilize machine learning to analyze the API and identify the UI in a UI repository.

16. A non-transitory computer-readable medium storing instructions, the instructions comprising:
one or more instructions that, when executed by one or more processors, cause the one or more processors to:
receive an input associated with developing an application;
identify a feature that is to be included in the application, the feature included in the input;
select an application programming interface (API) from an API repository,
the API to implement the feature of the application;
select a user interface (UI) to facilitate user interaction with the application based on the API; and
perform an action associated with developing the application,
the action including generation of application code, for the application, including mapping the API to the UI in the application code to enable user interaction with the API, and
the application code to be executed to implement the application.

17. The non-transitory computer-readable medium of claim 16, where the one or more instructions that cause the one or more processors to select the API, cause the one or more processors to:
identify a plurality of APIs in the API repository corresponding to the feature based on machine learning indicating the plurality of APIs are associated with the feature; and
select the API from the plurality of APIs based on the API satisfying a match threshold with the feature.

18. The non-transitory computer-readable medium of claim 16, where the one or more instructions, when executed by the one or more processors, further cause the one or more processors to:
deploy the application code to an application platform, the application platform to host the application by executing the application code.

19. The non-transitory computer-readable medium of claim 18, where the one or more instructions, when executed by the one or more processors, further cause the one or more processors to:
monitor operation of the application when hosted by the application platform; and
generate analytics associated with the API of the application for machine learning.

20. The non-transitory computer-readable medium of claim 16, where the one or more instructions that cause the one or more processors to select the API, cause the one or more processors to:
cross-reference the feature with respective features of a plurality of APIs in the API repository; and
select the API from the plurality of APIs when the feature satisfies a match threshold with at least one of the respective features of the plurality of APIs.

* * * * *